May 4, 1926.

F. A. EICHORN 1,582,911

EMERGENCY BRAKE AND SAFETY LOCK COMBINED

Filed Nov. 22, 1923      2 Sheets-Sheet 1

WITNESSES
J.T. Schrott.

INVENTOR
F.A. Eichorn.
BY
ATTORNEYS

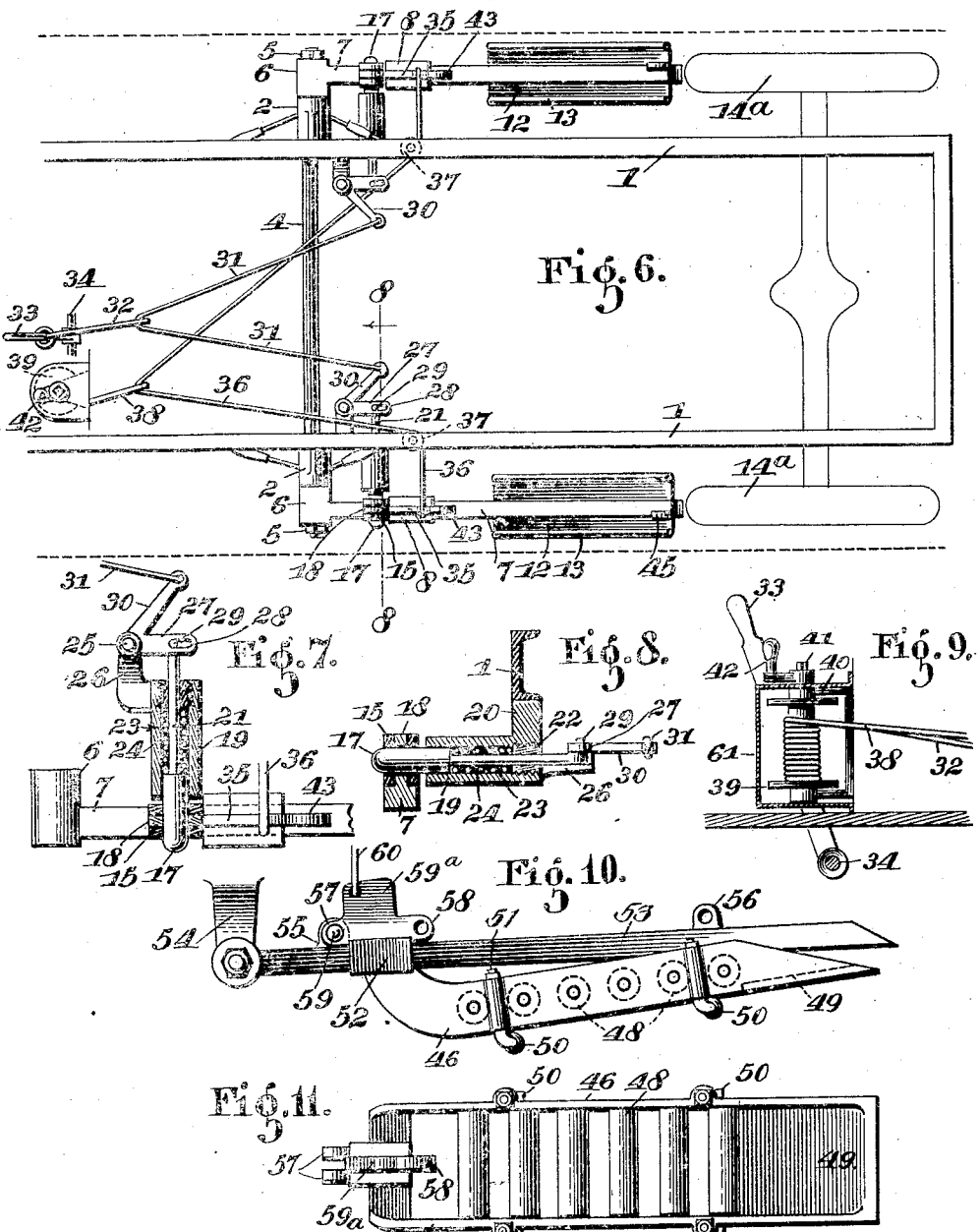

Patented May 4, 1926.

1,582,911

UNITED STATES PATENT OFFICE.

FRED ANTHONY EICHORN, OF CHATTANOOGA, TENNESSEE.

EMERGENCY BRAKE AND SAFETY LOCK COMBINED.

Application filed November 22, 1923. Serial No. 676,390.

*To all whom it may concern:*

Be it known that I, FRED ANTHONY EICHORN, a citizen of the United States, residing at Chattanooga, in the county of Hamilton, State of Tennessee, have invented certain new and useful Improvements in Emergency Brakes and Safety Locks Combined, of which the following is a specification.

My invention relates to improvements in brakes, particularly such as are adapted to be used on motor vehicles, and it consists of the constructions, combinations, and arrangements herein described and claimed.

An object of the invention is to provide a brake which is intended primarily to be used in emergencies, and adapted to be dropped upon the ground in such a manner that the rear wheels of the vehicle to which it is applied will run up thereon and bring the vehicle to a quick stop.

A further object of the invention is to provide an apparatus for the purpose described consisting of a pair of brake shoes which are adapted to be dropped on the ground so that the rear wheels of the vehicle will run up thereon and cause the vehicle to stop by virtue of the friction between the shoes and the ground.

Another object of the invention is to provide an apparatus of the character described which may be used with equal facility to run an automobile into the shop or to pull the automobile in on a flat tire.

Other objects and advantages will appear in the following specification, reference being had to the accompanying drawings, in which:—

Figure 1:
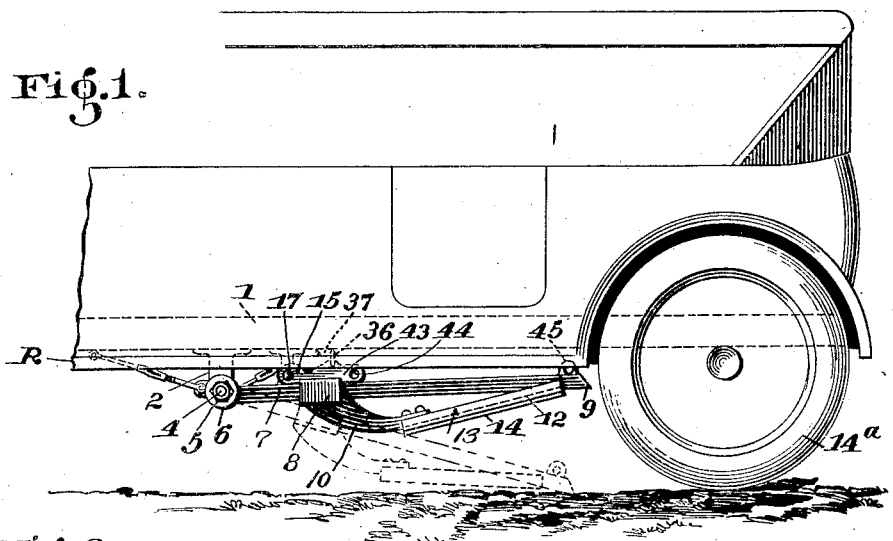
Figure 2:
Figure 3:
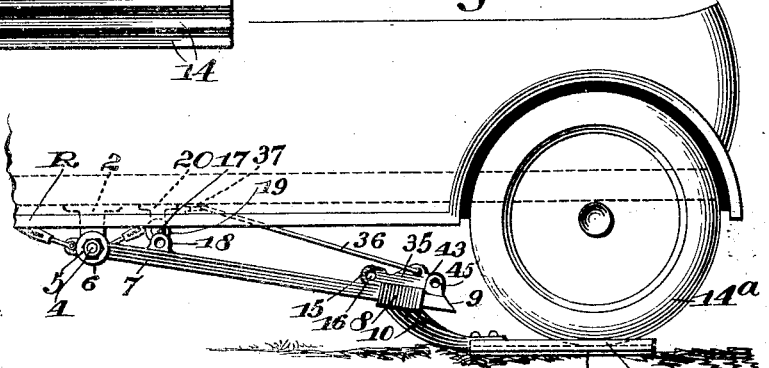
Figure 4:
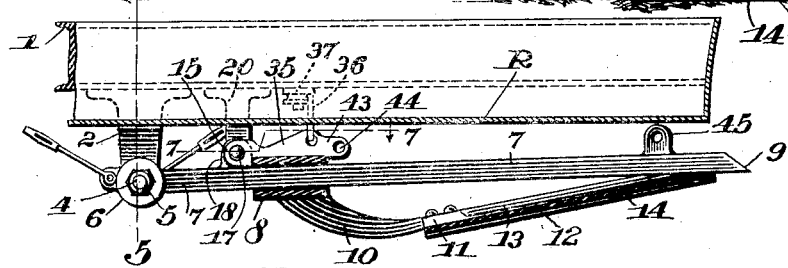
Figure 5:
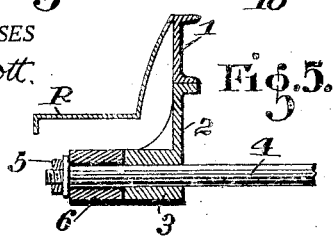

Figure 1 is a side elevation of a part of an automobile illustrating the application of the emergency brake and showing it in the inoperative position, Figure 2 is an inverted plan view of one of the brake shoes, Figure 3 is a side elevation similar to Figure 1 showing the brake in the operative position, Figure 4 is a section of the brake showing it in the position in Figure 1, Figure 5 is a cross section on the line 5—5 of Figure 4, Figure 6 is a plan view of enough of the chassis of the automobile to illustrate the relationship of the brake to the rear wheels, Figure 7 is a horizontal section taken substantially on the line 7—7 of Figure 4, Figure 8 is a cross section on the line 8—8 of Figure 6, Figure 9 is an elevation of the winding drum by which the brake shoes are hoisted, Figure 10 is a side elevation of a modification of the brake shoes, whereby some of the foregoing objects of the invention are accomplished, and Figure 11 is a plan view of the brake shoe in Fig. 10.

In referring to the invention as a brake the term is intended to be regarded as collective, including both brake shoes (Fig. 6) and all of the operating mechanism therefor. Inasmuch as the structure at each side of the chassis 1 is identical, the description of one brake shoe and its associated parts will suffice for both.

Pendant from the chassis 1 is a bracket 2 which has a boss 3 (Fig. 5) at one side to furnish a support through which one end of a rod 4 extends, the threaded end of the rod receiving a washer and nut 5 to hold the brake rod in place. The extending end of the rod 4 furnishes the bearing upon which the head 6 of the brake rod 7 swings. This brake rod is non-circular in cross section, preferably square, so that the brake head 8 may in turn slide back and forth on the rod. The free extremity of the brake rod is bevelled, at 9, to provide a point which becomes useful in entering the ground when stopping the automobile on a hill and utilizing the rod 7 as a prop as suggested by the dotted position of a part of the brake rod in Figure 1 in the event that the automobile starts rolling backward. In such case the brake shoes would tend to drag backward and the heads 8 slide up the brake rods until the ends 9 become free to engage the ground. The brake head 8 has an arm 10 which is suitably fastened, at 11, to the brake shoe 12. This brake shoe may be either of the forms in Figs. 1 and 4 or Fig. 10. The latter has some advantages over the former. These have been mentioned in the objects of the invention but are described in detail below.

In reference to the shoe 12 which is made of a rectangular plate of suitable material, preferably metal, the longitudinal edges of this are curled inwardly as 13 to provide flanges which prevent the rear wheel 14ª from leaving the brake shoe upon skidding of the automobile after the wheel has entered, as in Fig. 3. To resist such tendency of the automobile, the bottom of the shoe 12 is furnished with a plurality of longitudinal strips 14 which, like the shoe, may be made of various materials but this time preferably of wood.

Situated at the front of the head 8 is a pair of ears 15 which have registering openings 16 into which the plunger 17 (Figures 7 and 8) is thrust. The brake rod 7 has an apertured lug 18 around which the ears 15 fit, and when the head 8 is drawn up on the rod into a position where they do fit as stated, and the plunger 17 is thrust therethrough, the entire brake will be held up in the inoperative position shown in Figures 1 and 4.

The plunger 17 is movable in a cylindrical extension 19 of the bracket 20 (Figs. 4 and 8) which is pendant from the chassis 1. It is carried by a stem 21 which extends back and through a plug 22. The plug is screwed into the bore 23 in which the plunger is slidable. The variance in size between the plunger and the stem provides a space which is occupied by a spring 24. This spring presses between the plunger and the plug and holds the plunger in the extended position.

A bell crank retracts the plunger. It is pivoted at 25 on an extension 26 of the bracket 20. One arm 27 is slotted at 28 to receive the pin 29 on the extremity of the stem 21. The other arm 30 serves as a connection for a cable 31. Upon pulling on the cable the bell crank is rocked and the plunger 17 is retracted so that the brake is released from the chassis and the head 8 is left free to slide down into the position in Figure 3. Attention is directed to Figure 6. The cable 31 has common connection with the arms 30 of both bell cranks. This cable is then jointed with a single cable 32 which is connected with a lever 33 or some other suitable equivalent thereof. This lever is pivoted on a suitable support 34. The lever is situated in front of the front seat near the driver. Upon pressing forward on the lever the cable 31 in drawn up, the bell cranks are rocked with the result already stated.

That portion of the arm 10 which appears above the head 8 (Figs. 3 and 4) constitutes a rib 35 which furnishes a convenient fastening for the cable 36. This cable runs over a pulley 37 and has connection with a single cable 38 which is wound on a drum 39 (Fig. 9). The cable 36 is common to both brakes (Fig. 6), and when the cable 38 is wound on the drum both brake heads 8 are drawn up on the rods 7.

A bracket 40 (Fig. 9) furnishes the bearing for the shaft 41 of the drum 39. The upper end of this shaft is made non-circular so that the operating handle 42 may turn the drum. The drum is preferably concealed in a housing or cover 61 so that clothing may not entangle with the parts. The handle 42 may be removed if desired. This drum is situated adjacent to the lever 33 so that the operator may have both close at hand in case of necessity. The rib 35 terminates in a single ear 43 which has an opening 44 to register with a similar opening in a lug 45 on the extremity of the brake rod 7. The lug 45 not only limits the extension of the brake shoe on the rod (Fig. 3) but also furnishes one of the elements of a safety lock. When the two openings register, as stated a lock may be applied to both brake heads to keep the shoes 12 in braking position beneath the rear wheels 14. It would be impossible to get away with the automobile with the shoe 12 in this position.

The modification in Figure 10 is the same as the form in Figure 1, so far as the principle is concerned, but has some advantages which the former does not have. The brake shoe now comprises a frame 46 between the side members of which a plurality of rollers 47 have bearing. The rollers are solid, and the ends 48 are turned down into the spindles of reduced diameter to furnish the bearing mentioned. The sides of the frame 46 correspond with the flanges 13 of the brake shoe 12 and perform an identical function in preventing the escape of the wheel upon skidding of the automobile.

A tread plate 49 connects the sides of the frame at the front. The rear wheel passes over this plate in running up on the rollers. The rollers 47 are not intended to touch the ground, and in order to prevent this the brake shoe is mounted on four wheels 50 or casters which are carried by spindles 51 supported by the frame. These are removable if desired so that the frame sides 46 may drag in the ground as in the case of the first form.

The frame of the brake shoe includes a head 52 which is slidable on a non-circular brake rod 53. This brake rod swings on a bracket 54, and has a pair of lugs 55 and 56 which co-operate with ears 57 and 58 for the respective purposes of furnishing a receptacle for the locking plunger 59 and entering into registration for the application of a safety lock. A rib 59ª furnishes the brace for attachment of a hoisting cable 60.

The operation may be readily understood from the foregoing description. It has already been stated that the description of one brake shoe, as in Figure 1, applies to both, as in Fig. 6.

Assume the brake to be elevated as in Figure 1. This is the inoperative position. The brake occupies a place under the running board R of the automobile, thereby being inconspicuous so far as appearance is concerned, and in direct line with the rear wheel 14 in readiness for release. The brake is used principally for emergency purposes. The other brake of the automobile is used in ordinary running.

Upon the necessity for the emergency brake the operator presses forward on the lever 33. This rocks both bell cranks 30 (Fig. 6) simultaneously so that the plungers 17 are retracted within the cylinder 19. The plunger normally furnishes the support for the brake, and the support now being removed the brake drops toward the ground.

The shoe 12 strikes first, and in dragging upon the ground pulls back on the head 8 so that the head slides back on the rod 7 until it is stopped by the lug 45. In sliding back the cable 38 is unwound from the drum 39. The drum offers no obstruction to the unwinding of the cable, no locking device being used to hold the drum in the wound position.

As soon as the shoe 12 has extended far enough on the rod 7 the wheel 14 will ride up thereon, and the forward turning of the wheel will hasten the interposition of the shoe between the wheel and the ground. The shoe will drag on the ground and quickly stop the automobile. The momentum of the wheel 14 will be expended on top of the brake shoe. The upper surface of the shoe may be lightly greased so that the wheel will slip thereon more easily.

Upon releasing the emergency brake the vehicle may be backed slightly until the wheels 14 run off the shoes 12. The handle 42 is now used to turn the drum 39 and wind the cable 38. This pulls on the cables 36 so that the head 8 is slid up on the rod 7 until it strikes the lug 18. Continued pulling of the cables 36 will draw the brake up into position adjacent to the end of the cylinder 19. The lever 33 is now worked back and forth, and the operator will soon feel when the plunger 17 enters the now aligning openings in the ears 15 and lug 18.

The operation of the modification in Figure 10 is identical with the foregoing, only instead of the rear wheel 14 running up on the greased brake shoe or plate it now runs up on rollers 47 which have much the same effect. In the event of a flat tire the brake shoe in Fig. 10 becomes quite useful inasmuch as it may be run under the tire and used as a towing carriage for the automobile. This type of brake shoe is also useful in running the automobile to the shop in case it has been disabled otherwise.

Again, when it is desired to run the automobile engine and shift the gears for various speeds it becomes convenient to run the rear wheels upon the roller shoe in Figure 10, the rollers permitting the wheels to turn while the automobile remains stationary.

In both modifications the ends of the brake rods 7 and 53 are pointed. The brake rods extend beyond the shoes when in the retracted position, and it is, therefore, not difficult to merely let the rods down far enough to bring the pointed ends in engagement with the ground and thereby turn the rods into props when the automobile is stopped on a hill. Due to the fact that various automobiles have bodies of different construction it will be necessary to design different kinds of brake rod supports. This, however, is nothing more than mechanical skill.

While the construction and arrangement of the improved emergency brake as herein described and claimed is that of a generally preferred form, obviously modifications and changes may be made without departing from the spirit of the invention or the scope of the appended claims.

I claim:—

1. In combination with the chassis and rear wheel of a motor vehicle, a brake rod hung on the chassis, a brake head slidable on the rod, a brake shoe carried by the head, means including a plunger carried by the chassis to engage the head and hold the foregoing parts elevated, and means to displace the holding means permitting the rod to drop until the shoe engages the ground, the resulting frictional engagement sliding the head back until said wheel rides up on the shoe.

2. In combination with the chassis and rear wheel of a motor vehicle, a brake rod hung on the chassis, a brake head slidable on the rod, a brake shoe carried by the head, means including a plunger carried by the chassis to engage the head and hold the foregoing parts elevated, means to displace the holding means permitting the rod to drop until the shoe engages the ground, the resulting frictional engagement sliding the head back until said wheel rides up on the shoe, and means on the rod engaged by the head to limit the sliding movement thereof.

3. In combination with the chassis and rear wheel of a vehicle, a bracket pendant from the chassis, a brake rod swingable on the bracket, a brake head slidable on the rod, a brake shoe carried by the head, apertured ears on the head, a plunger carried by the chassis engaging the ears to both hold the rod and shoe up and the brake head retracted on the rod, and means to displace the plunger permitting the rod to swing down until the shoe strikes the ground, the resulting friction sliding the head back on the rod until the rear wheel runs up on the shoe.

4. In combination with the chassis and rear wheel of a vehicle, a bracket pendant from the chassis, a brake rod swingable on the bracket, a brake head slidable on the rod, a brake shoe carried by the head, apertured ears on the head, a plunger carried by the chassis engaging the ears to both hold the rod and shoe up and the brake head retracted on the rod, means to displace the plunger permitting the rod to swing down until the shoe strikes the ground, the resulting friction sliding the head back on the rod until the rear wheel runs up on the shoe, and a lug at the extremity of the rod limiting the sliding of the head and extension of the shoe.

5. In combination with the chassis and rear wheel of a vehicle, a bracket carried by the chassis, a brake head having a pair of apertured ears, a brake rod swingable on the bracket on which the head is slidable, said rod being non-circular to prevent turning of the head, a brake shoe carried by the head, an apertured lug on the rod with which said ears register, another bracket on the chassis, a cylinder carried by the bracket, a plunger operable in the cylinder, a spring extending the plunger through the ears and lug to both hold the rod and shoe elevated and lock the head in a retracted position on the rod, and means to displace the plunger against the spring to release the rod and permit the rearward sliding of the head when the shoe strikes the ground.

6. In combination with the chassis and rear wheel of a vehicle, a brake shoe, a brake head by which it is carried, a brake rod on which the shoe is slidable, a bracket by which the rod is swung on the chassis, a winding drum having cable connected with the head to slide the head back on the rod then swing the rod upward, apertured ears carried by the head, an apertured lug on the rod with which said ears then register, a spring plunger carried by the chassis, and a lever having connections for operating the plunger to either find the apertures in said ears and lug to hold the rod and shoe elevated or release said plunger therefrom to drop the rod.

7. A brake of the character described including a swingable rod having a sharpened end adapted to engage the ground and serve as a prop, and a brake shoe which is movable upon said rod into a retracted position permitting said rod to function as a prop or extensible thereupon to the braking position rendering the prop inoperative.

8. A device of the character described comprising a pair of brake rods to be attached to the chassis of a motor vehicle, an apertured lug near the extremity of each, brake shoes upon which the rear wheels of said vehicle may run to lift them off the ground, and means carrying the brake shoes slidable on the rods into proximity with said lugs, said means having apertured ears to register with said lugs and receive a locking device.

FRED ANTHONY EICHORN.